United States Patent [19]

Maggioni

[11] 4,365,644
[45] Dec. 28, 1982

[54] AUTOMATIC TIMER VALVE FOR CONTROLLING THE OUTPUT OF IRRIGATION PLANT

[75] Inventor: Virginio Maggioni, Rosta, Italy

[73] Assignee: Centro Ricerche Fiat S.p.A., Turin, Italy

[21] Appl. No.: 140,544

[22] Filed: Apr. 15, 1980

[30] Foreign Application Priority Data

Apr. 26, 1979 [IT] Italy .............................. 67880 A/79

[51] Int. Cl.³ ............................................ F16K 11/14
[52] U.S. Cl. ................................. 137/102; 137/627.5; 137/614.11
[58] Field of Search ................. 137/102, 116.3, 116.5, 137/627.5, 624.14, 624.11, 624.18

[56] References Cited

U.S. PATENT DOCUMENTS 3,536,089 10/1970 Sarbach ............................ 137/116.3
3,769,997 11/1973 Hardwick ........................... 137/102

*Primary Examiner*—Alan Cohan
*Attorney, Agent, or Firm*—Sughrue, Mion, Zinn, Macpeak & Seas

[57] ABSTRACT

An automatic timer valve for irrigation plant includes a tubular differential-area piston which defines respective major-diameter and minor-diameter chambers in a hollow valve body. The chambers normally communicate through the piston to allow water to flow interruptedly from an inlet to an outlet. A build-up of back-pressure at the outlet acts against the major face of the piston and, overcoming the inlet pressure, advances the piston against a spring to cause abutment of the shutter disc and an annular shoulder. This abutment cuts off the flow, with the exception of a restricted passage, and puts the outlet into communication with a drain outlet. When the pressure in the outlet drops, the higher relative pressure at the inlet displaces the piston in a reverse stroke and uninterrupted flow recommences.

8 Claims, 5 Drawing Figures

AUTOMATIC TIMER VALVE FOR CONTROLLING THE OUTPUT OF IRRIGATION PLANT

The present invention relates to an automatic timer valve for controlling the output of irrigation plant.

The invention is concerned, more particularly with an automatic timer valve of the type comprising a hollow body which houses a differential-area piston, the faces of which cooperate with opposing ends of the body cavity to define respective chambers which communicate with the outside through respective connector spigots, a spring interposed between the body and the piston to urge the latter towards the chamber defined by the major-diameter part of the piston, and a third connector spigot which connects the cavity with the outside and which is normally isolated from both chambers.

In known valves of this type, the chamber defined by the minor-diameter part of the differential piston further communicates with the outside through a fourth connector spigot, and the minor-diameter part of the piston normally closes the third connector spigot which communicates with the aforesaid chamber when the piston advances against the action of the spring.

When known timer valves of this type are used in irrigation plant, the two spigots communicating with the chamber defined by the minor-diameter part of the piston are connected to a source of water under pressure, such as, for example, the delivery outlet of a positive displacement pump, and an irrigation feed line respectively, while the third spigot is connected either to a drain pipe or a point downstream of the source of water under pressure. The chamber defined by the major-diameter part of the piston may be connected to that end of the irrigator feed line farthest from the pump, in the case of an irrigation plant which operates intermittently and sequentially (as described, for example, in Italian application No. 70139-A/76). Alternatively, if the plant operates intermittently and is of the type in which the delivery cycles are initiated by a drop in pressure along the irrigator supply line (as described, for example, in U.S.S.R. Certificate of Inventorship No. 454876), the latter chamber may be connected to a water supply tank which, being close to the timer valve, is fed through a flow restriction.

This known type of timer valve suffers, however, from various drawbacks and, in practice, its use is restricted to irrigation plant of the type in which the irrigation is initiated by a fall in pressure along the irrigator feed line. The use of such a valve in irrigation plant of this type determines the arrangement and/or construction of the plant, since it requires the use of a tank with particular characteristics and, in the first case considered above, that the irrigator feed line is formed into a closed loop or ring main. In the other case considered above, the use of such a valve requires that the irrigator feed line forms a part of the connection between the valve and the tank associated with the irrigator adjacent the valve, the latter being arranged adjacent the source of water under pressure and the drain.

In both the above cases the opening of the drain outlet does not interrupt communication between the source of water under pressure and the irrigator feed line. Therefore, if the irrigators are connected directly to the feed line, a fall in pressure reduces but does not halt, irrigation. To operate correctly as a timer valve, however, the arrangement should respond to a predetermined drop in line pressure to close the valve, so that the valve is opened periodically for finite time intervals.

The object of the present invention is to provide an improved automatic timer valve for controlling the output of irrigation plant, which obviates the drawbacks discussed above.

Accordingly, the present invention provides an automatic timer valve of the aforesaid type, characterised in that: the respective chambers defined by opposite ends of the piston communicate through interconnecting passages which are made in the valve body and are closed by the advance of the piston against the action of the spring; communication between the third connector spigot and the chamber defined by the major diameter part of the piston is opened when said internconnecting passages are closed, and a flow restriction passage connects the chambers when said internconnecting passages are closed.

In a preferred embodiment of the invention, the interconnecting passages comprise an axial cavity through the piston, the third connector spigot communicating therewith by means of a tubular element which has an end portion projecting coaxially, and with radial clearance, into said axial cavity from the chamber defined by the major-diameter face of the said piston, the open end of the end portion defining an orifice which is normally closed by a shutter disc which is biassed against the orifice by resilient means, and has a diameter greater than the external diameter of the end portion, the orifice being opened, upon advance of the piston, by abutment of the face of the shutter disc adjacent said orifice with opening means which are provided in said axial passage and spaced from the disc.

Preferably, the orifice opening means comprise an annular radial shoulder, having an internal diameter which is less than the external diameter of the shutter disc and greater than the external diameter of the end portion of said tubular element.

In one preferred embodiment, a small hole is made through that part of the disc facing the annular gap between the orifice of the end portion and the internal periphery of the annular shoulder, the hole comprising said flow restriction passage which maintains communication between the chambers when the interconnecting passages are closed by the abutment of the annular shoulder with the disc.

Preferably, the shutter disc is carried at one end of a shaft which is slidable within that portion of the axial cavity within the minor-diameter part of the piston.

In a preferred embodiment, the resilient means biassing the shutter disc comprise a compression spring which is located within that portion of the axial cavity within the minor-diameter part of the piston so as to act between the other end of the shaft and an internal annular flange provided within the minor-diameter part of the differential piston.

Preferably, the shaft is tubular, having adjacent the end carrying the shutter disc a pair of radial passages opening into the respective chamber, the hollow shaft communicating with the other chamber at its other end.

According to another preferred embodiment the shutter disc is carried at one end of a shaft which is housed within a cylindrical bush, so as to be slidable relative to that portion of the axial cavity within the minor-diameter part of the piston, the shaft being biassed towards said orifice by a compression spring located between the shaft and one end of the cylindrical bush, the latter being sealingly slidable in a wall at one end of a cylinder which is attached, by radial ribs, to the inner surface of the respective chamber defined by the minor diameter face of the piston, so as to be spaced from said surfaces and the adjacent end wall of the chamber, the cylinder being open at its other end and housing an auxiliary piston which is sealingly slidable therein, and supported by the end of the cylindrical bush projecting into the cylinder, the bush carrying, on a part situated externally relative to the cylinder, a radial flange which supports the end of the spring opposite that which acts on the differential-area piston.

The invention will now be more particularly described, by way of example, with reference to the accompanying drawings, in which.

In the drawings, similar or corresponding parts are indicated by the same numerals.

Figure 1:
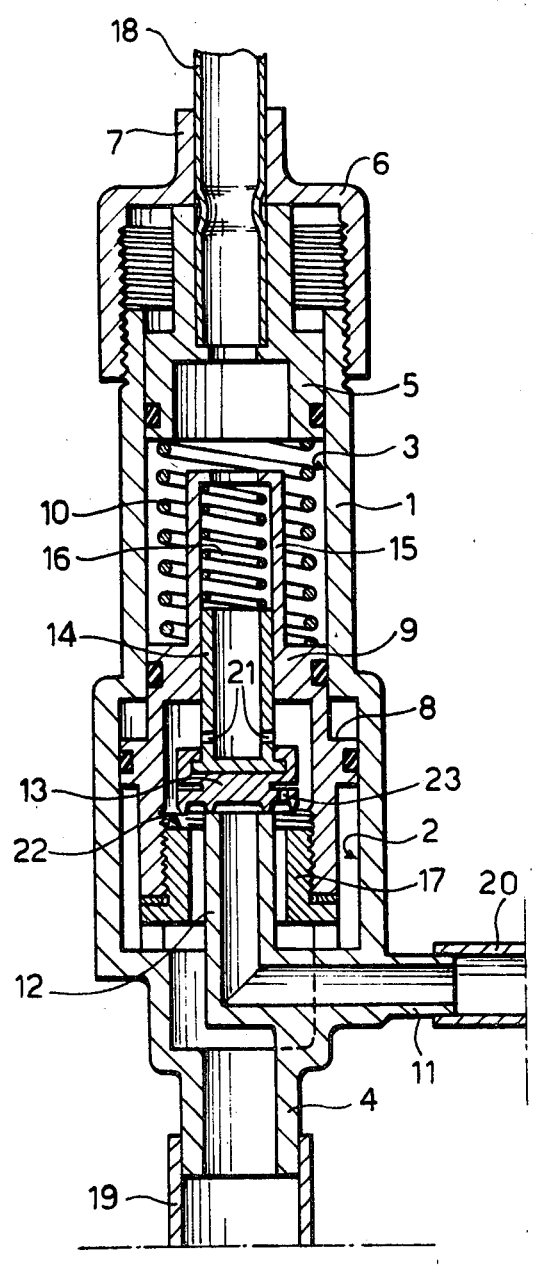
FIG. 1 is an axial sectional view of an automatic timer valve according to first embodiment of the present invention, shown in a position of rest.

Referring now to FIG. 1 of the drawings, there is shown an automatic timer valve having a hollow body 1, in which the internal cavity comprises a first, major cylindrical portion 2 which at one end adjoins coaxially a second, minor cylindrical portion 3 with a smaller diameter than the major portion 2. The other end of the major portion 2 is closed by an end wall which is integral with the valve body 1, and is provided with a first connector spigot 4 enabling communication between the major portion 2 and the outside. The opposite end of the minor portion 3 is closed by an adjustable screw-threaded cap 6, which is screwed over the end of the valve body 1 and is provided axially with a second connector spigot 7 allowing communication between the minor portion 3 and the outside. A tubular member 5 is sealingly slidable in the end of the minor portion 3 of the valve body 1 and extends axially within the cap 6 so as to be coaxial with the second spigot 7, and in communication therewith.

The valve body 1 houses a tubular differential-area piston having a major-diameter part 8, which is sealingly slidable in the major portion 2 of the body 1, and a minor-diameter part 9, which is sealingly slidable in the minor portion 3 of the body 1. The faces of the piston 8,9 define, within respective portions 2,3 of the valve body 1, respective outlet and inlet chambers. The piston 8,9 is biassed towards the end of the body 1 having the first spigot 4, hereinafter termed the bottom end, by a helical compression spring 10 interposed between the face of the minor-diameter part 9 of the piston and the tubular element 5.

The bottom end of the body 1 is provided with a third, radially-projecting connector spigot 11, which extends within the body as a tubular element having an end portion 12 projecting coaxially into the cavity of the piston 8,9. The open end of the end portion 12 forms an orifice which faces the cap 6, and is normally closed by a shutter disc 13 carried at one end of a hollow shaft 14 mounted slidably in the axial cavity extending through the minor-diameter part 9 of the differential-area piston, and in part of a reduced-diameter axial extension 15 of the minor-diameter part 9. The shaft 14, and hence the shutter disc 15, is biassed towards the orifice by a helical compression spring 16 which is interposed between the other end of the shaft 14 and an internal annular flange formed at the free end of the axial extension 15.

The external diameter of the shutter disc 13 is greater than the external diameter of the end portion 12, but is less than the internal diameter of the major-diameter part 8 of the piston in which it is housed.

A flanged bush 17 is screwed into the end of the major-diameter part 9 of the piston adjacent the bottom end of the valve body. The internal diameter of the bush 17 is less than the external diameter of the shutter disc 13 and greater than the external diameter of the end portion 12 of the tubular element communicating with the third spigot 11. The end of the bush 17 adjacent the shutter disc 13 defines an annular shoulder 22 and is normally spaced from the shutter disc 13, as shown in FIG. 1.

In use, the timer valve is incorporated in an irrigation plant, the second spigot 7 being connected to a source of water under pressure, for example, the delivery outlet of a positive-displacement pump (not shown) by means of an inlet pipe 18, which is inserted through the spigot 7 into the tubular member 5 and gripped by an internal lip on the spigot 7. The first spigot 4 is connected by means of an outlet pipe 19 to feed lines supplying the irrigator outlets, and the third spigot 11 is connected to a drain by a respective pipe 20.

When an irrigation cycle commences, the water flows uninterruptedly from the inlet pipe 18 to the outlet pipe 19 through the cavity of the piston 8,9, the latter including the tubular shaft 14 which is provided with radial ports 21 adjacent the end carrying the shutter disc 13.

Figure 2:
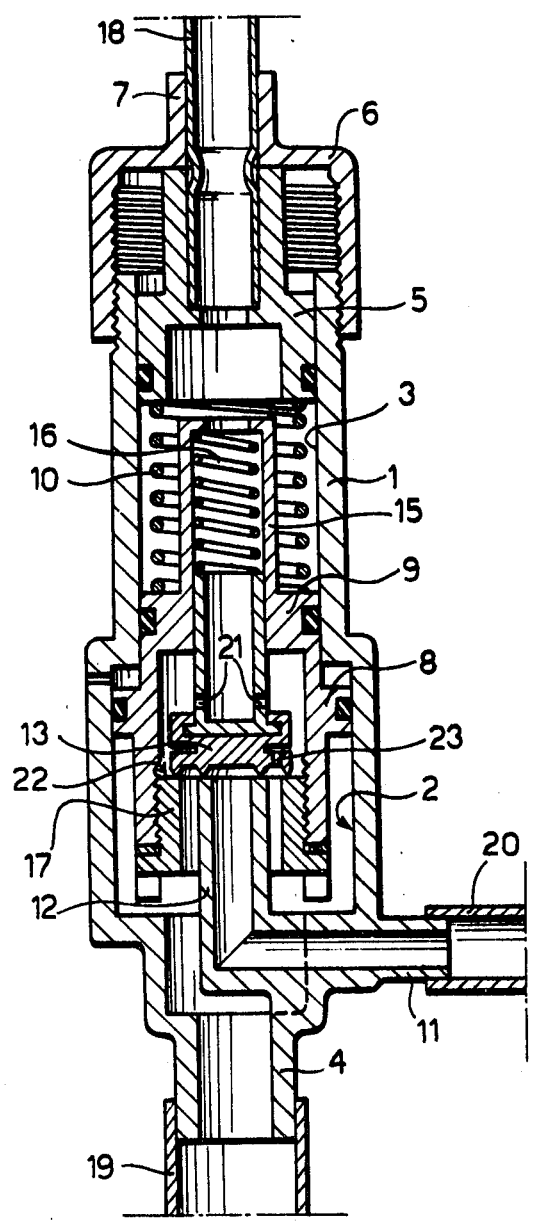
FIGS. 2 and 3 show the valve of FIG. 1 in two successive stages of operation.

The supply of water to the irrigators causes a back-pressure to build up in the feed lines and act on the major-diameter part 8 of the piston 8,9. When this back-pressure reaches a value, which is predetermined by the stress of the spring 10, where it overcomes the pressure in the inlet pipe 18, it initiates an advance stroke of the piston 8,9 against the action of the spring 10. This advance stroke causes the annular shoulder 22 to abut the shutter disc 13, such that communication between the inlet pipe 18 and the outlet pipe 19 is provided only by a flow restriction hole 23 in the shutter disc 13 in a position facing the annular space between the internal wall of the bush 17 and the external wall of the end portion 12 of the tubular element. In this way the flow of water to the irrigators is almost cut off (FIG. 2).

Figure 3:
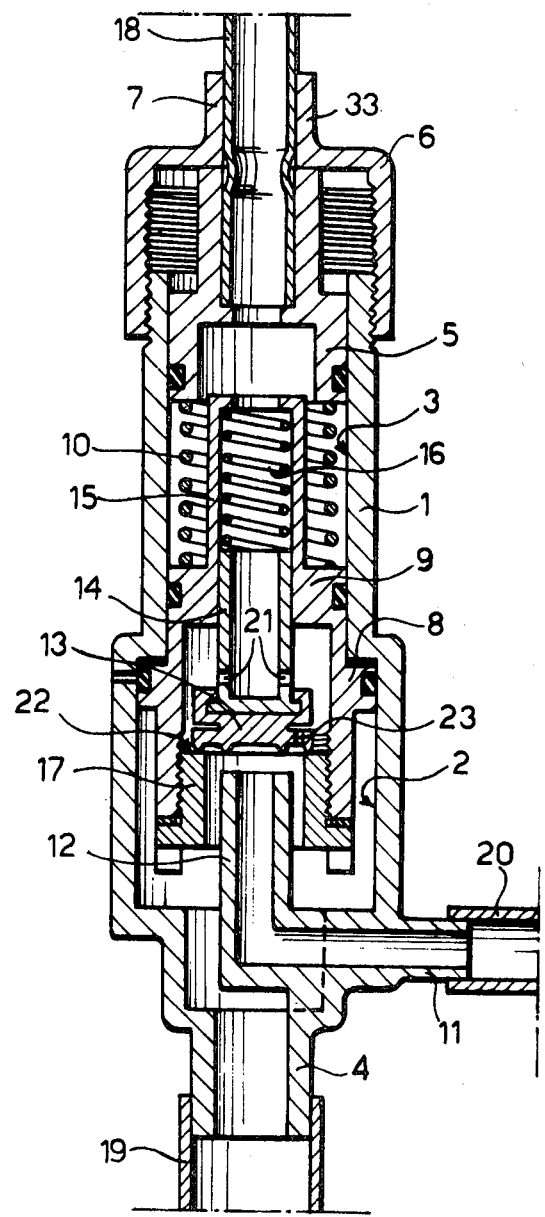

At the same time the continuing advance stroke of the piston 8,9 causes, through the continued engagement of the annular shoulder 22 with the shutter disc 13, sliding of the shaft 14 against its respective spring 16. The axial displacement of the shaft 14, opens the orifice of the end portion 12 and thereby puts the outlet pipe 19 into communication with the drain pipe 20 on the third spigot (FIG. 3).

The draining of the irrigator feed lines results in a fall in pressure in the outlet pipe 19 below that exerted on the minor-diameter part 9 of the piston 8,9 by the water entering the valve under pressure through the inlet pipe 18, which bleeds through the flow restriction hole 23. The pressure unbalance thus created between the inlet and outlet allows a reverse stroke of the piston 8,9 under the action of the spring 10, and results in the closing of the orifice of the end portion 12 by the shutter disc 13.

The subsequent separation of the shoulder 22 from the disc 13 puts the inlet pipe 18 back into communication with the outlet pipe 19 and initiates another irrigation cycle, as described above.

The pressure necessary to trigger the advance stroke of the piston 8,9 in each cycle can be regulated by by varying the stress of the spring 10. This is effected by screwing the cap 6 up or down on the valve body 1.

Figure 4:
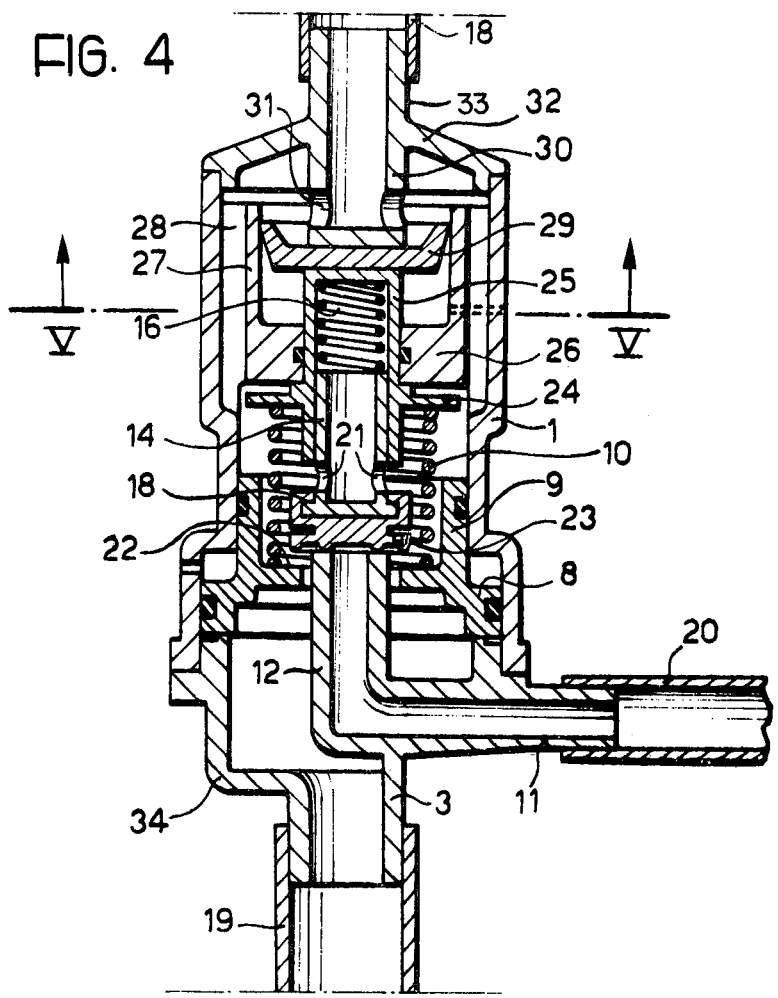
FIG. 4 is an axial sectional view of an automatic timer valve according to a second embodiment of the invention.
Figure 5:
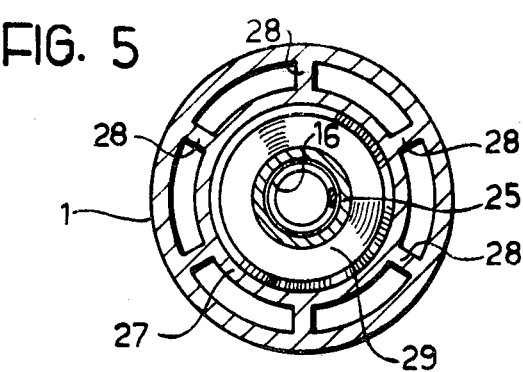
FIG. 5 is a cross section taken along the line V—V of FIG. 4.

In the embodiment shown in FIGS. 4 and 5, the stress of the spring 10 is varied automatically as a function of the pressure of the water delivered through the inlet pipe 18. In this case, the end of the spring 10 opposite that which acts on the piston 8,9 bears against an annular radial flange 24 formed adjacent the open end of a tubular bush 25 which is sealingly slidable in an axial hole made in the end wall 26 of a cylinder 27. The cylinder 27 is open at its other end and is spaced from the inner surface of the valve body 1, being joined thereto by radial ribs 28 (FIG. 5).

The closed end of the tubular bush 25 projects into the cylinder 27, and rests against the outer end face of an auxiliary cup-shaped piston 29 which is made from a resilient material and is mounted slidably within cylinder 27. The internal end face of the auxiliary piston 29 abuts the closed end of an internal axial extension 30 of an inlet connector spigot 33. The spigot extension 30 has radial ports 31 adjacent its closed end for the admission of water from the inlet pipe 18 attached, in use, to the spigot 33. Both the spigot extension 31 and the spigot 33 are formed integrally with a non-adjustable cap 32 closing the end of the minor-diameter portion of the valve body 1.

In use, the valve of this embodiment is connected into an irrigation plant for operation in a similar manner so that described previously.

In this embodiment, however, the stress of the piston-biassing spring 10, and therefore the pressure at the outlet 19 necessary to advance the piston 8,9, is adjusted continuously as a function of the water pressure at the inlet spigot 33, by means of the resilient auxiliary piston 29. Water under pressure acts, through the open end of the cylinder 27, upon the auxiliary piston 29 to displace the latter downwardly, as shown in FIG. 4, whilst deforming it radially into frictional contact with the cylinder 27. The displacement of the piston 29 cause a corresponding displacement of the bush 25 which, in turn further compresses the spring 10, increasing its stress.

When the pressure against the auxiliary piston 29 is reduced, due to a reduction of inlet pressure or the resumption of uninterrupted flow from the inlet pipe 18 to the outlet pipe 19, the combined action of the springs 10,16 displaces the auxiliary piston 29 back to a position corresponding to the reduced pressure. In effect, as the pressure against the major-diameter part 9 of the differential-area piston 8,9 increases so does the pressure necessary to continue its advance.

The contact between the closed end of the bush 25 and the auxiliary piston 29, and between the latter and the closed end of the spigot extension, is ensured by the stress of the spring 16 which bears against the free end of the disc-carrying shaft 14 mounted slidably in the cavity of the bush 25.

The embodiment of FIGS. 4 and 5 further differs from that shown in FIGS. 1 to 3 in that the annular radial shoulder 22 is internal and is formed integrally with the different area piston 8,9 to support the compression spring 10. In this embodiemnt the bottom end of the valve body 1 (that is, the end with the first spigot 4) is closed by a separate cover 34 with which the first and third spigot 4,11 end portion 12 are integral.

A timer valve according to the invention is suitable for use in any type of irrigation plant and is simple to incorporate in such plant since only two ducts have to be connected to existing piping, the third being a drain.

What is claimed is:

1. An automatic timer valve for controlling the output of an irrigation plant comprising a hollow body having opposing end walls, inlet and outlet means extending through said end walls for communicating the interior of said hollow body with a source of water under pressure and irrigator outlets, respectively, a one piece differential area piston slidably housed within said hollow body to define with said end walls an inlet chamber and an outlet chamber, a spring disposed in said inlet chamber for urging said piston towards said outlet chamber which is defined by the major diameter part of said piston, drain means extending through said body for connecting said outlet chamber with the outside, passage means extending through said piston to interconnect said chambers and valve means operatively associated with said passage means and said drain means for normally maintaining said passage means open and said drain means closed, whereby upon buildup of a back pressure in said outlet means said piston is moved against the force of said spring causing said valve means to close said passage means and open said drain means thereby communicating said outlet means with said drain means.

2. An automatic timer valve as set forth in claim 1, wherein said passage means comprises an axial cavity through said piston and wherein said valve body includes a tubular element which projects coaxially with radial clearance into said axial cavity from the outlet chamber defined by said major diameter piston part so that its end portion opening into said cavity defines an orifice providing communication between said drain means and said axial cavity, said valve means including a shutter disc which normally closes said orifice and has a diameter greater than the external diameter of said end portion, resilient means which bias said shutter toward said orifice to close the latter and abutment means on said piston means which are provided in said axial cavity so as to be spaced from said shutter disc and which, upon movement of said piston against the force of said spring abuts the face of said shutter disc adjacent said orifice to open the latter.

3. An automatic timer valve as defined in claim 2, wherein said abutment means comprise an annular shoulder on said piston having an internal diameter which is less than the external diameter of said shutter disc and greater than the external diameter of said end portion of said tubular element.

4. An automatic timer valve as defined in claim 2, further comprising additional restricted flow passage means comprised of a small hole through that part of said shutter disc facing the annular space between said orifice of said end portion and the internal periphery of said annular shoulder.

5. An automatic timer valve as defined in claim 2, wherein a shaft is slidable within that portion of said axial cavity within the minor-diameter part of said piston, said shaft carrying said shutter disc at one end.

6. An automatic timer valve as defined in claim 5, wherein said resilient means biassing the shutter disc comprise a compression spring, which is located within that part of said axial cavity within said minor-diameter part of said piston, so as to act between said shaft and an internal annular shoulder provided within said minor-diameter piston part.

7. An automatic timer valve as defined in claim 5, wherein said shaft is tubular, defining adjacent said end carrying said shutter disc radial passages opening into the respective said chamber, said shaft communicating with the other said chamber at its other end.

8. An automatic timer valve as defined in claim 2, wherein said valve further includes:
a cylinder which is closed at one end, and is attached to the inner surface of the respective said chamber defined by the minor-diameter part of said piston, so as to be spaced from said surface and the adjacent said end wall of said valve body, the cylinder being open towards said end wall;
radial ribs attaching said cylinder to said inner surface;
a cylindrical bush having one end slidable in said closed end of said cylinder;
a radial flange adjacent said other end of said bush, outside said cylinder, which supports one end of said spring acting on said differential-area piston;
a shaft which carries said shutter disc at one end and is housed within said cylindrical bush so as to be slidable relative to that portion of said axial cavity within said minor-diameter part of said piston, said resilient means being located between the other end of said shaft and said bush, and
an auxiliary piston which is sealingly slidable within said cylinder, and is supported by said one end of said cylindrical bush projecting into said cylinder.

* * * * *